United States Patent [19]

Scharfe et al.

[11] 3,734,950

[45] May 22, 1973

[54] PRODUCTION OF 3-ACETOXY-2-METHYLENE PROPIONIC ACID ALKYL ESTERS

[75] Inventors: Gerhard Scharfe, Leverkusen; Wolfgang Swodenk, Odenthal-Globusch; Johann Grolig, Leverkusen; Manfred Martin, Cologne, all of Germany

[73] Assignee: Farbenfabriken Bayer Aktiengesellschaft, Leverkusen, Germany

[22] Filed: July 29, 1970

[21] Appl. No.: 59,357

[30] Foreign Application Priority Data

Aug. 1, 1969 Germany .................... P 19 39 143.6

[52] U.S. Cl. ............................................. 260/484 A
[51] Int. Cl. ............................................. C07c 69/66
[58] Field of Search .................................. 260/484 A

[56] References Cited

UNITED STATES PATENTS 2,487,849  11/1949  Caldwell ........................... 260/484 A
2,514,672  7/1950  Reynolds et al. ................. 260/484 A Primary Examiner—Henry R. Jiles
Assistant Examiner—Paul J. Killos
Attorney—Burgess, Dinklage and Sprung

[57] ABSTRACT

A process for the production of 3-acetoxy-2-methylene propionic acid alkyl esters, wherein methacrylic acid alkyl ester, oxygen and acetic acid are reacted in the gas phase at a temperature of from about 50 to 250°C in the presence of a palladium catalyst containing an alkali metal acetate. The catalyst may contain additions of one or more metals or compounds of metals selected from the group consisting of gold, copper and metals of the fifth to eighth Groups of the Periodic System.

7 Claims, No Drawings

PRODUCTION OF 3-ACETOXY-2-METHYLENE PROPIONIC ACID ALKYL ESTERS

This invention relates to the production of alkyl esters of 3-acetoxy-2-methylene propionic acid.

It has been found that 3-acetoxy-2-methylene propionic acid alkyl esters can be obtained by reacting methacrylic acid alkyl esters, oxygen and acetic acid in the gas phase at temperatures of from about 50 to 250°C in the presence of palladium catalysts containing alkali metal acetate.

The palladium may be used either in the form of palladium metal or in the form of palladium compounds which preferably are substantially free from halogen, sulphur and nitrogen, for example, in the form of palladium acetate, palladium benzoate, palladium propionate, palladium acetyl acetonate or palladium hydroxide. Examples of the alkali metal compounds include compounds of potassium, sodium, lithium, rubidium and caesium. Instead of the alkali metal acetates, it is also possible to add to the catalysts compounds of the kind which are converted either wholly or in part into the acetates under the reaction conditions such as, for example, formates, propionates, hydroxides, carbonates, phosphates, borates, citrates, tartrates or lactates.

It is also possible to add to the catalyst metals or compounds which influence both the activity and the selectivity of the catalyst. Examples of suitable additives include metals of the fifth to eighth Group of the Periodic System and/or gold and/or copper. The metals may also be used in the form of compounds which are substantially free from halogen, sulphur and nitrogen. The following are mentioned as examples of suitable additives: gold, iridium, ruthenium and rhodium in the form of metals, oxides or hydroxides, in addition to oxides, hydroxides, acetates and acetyl acetonates, or decomposition and conversion products thereof, of the elements iron, manganese, chromium, tungsten and molybdenum.

The catalysts are preferably applied to supports such as for example silica, natural and synthetic silicates, activated carbon, aluminum oxide, spinels, pumice and titanium dioxide. It is preferred to use supports of the kind which show outstanding chemical resistance to acetic acid, such as silica for example. The catalyst may be used for example in the form of pellets, slugs or beads, e.g., in the form of beads of 4 to 6 mm in diameter.

The catalysts can be prepared in different ways. For example, compounds of the metals may be dissolved in a solvent, and the support impregnated with the resulting solution and then dried. However, the support may also be successively impregnated with the components which may then optionally be converted by an intermediate treatment such as calcination or treatment with chemicals such as solutions of alkali metal hydroxides, alkali metal carbonates or reducing agents. The catalysts may be prepared from compounds such as, for example, sodium-palladium chloride, tetrachloroauric acid and iron chloride and these compounds may subsequently be converted on the support into insoluble compounds which are preferably substantially free from sulphur, nitrogen and halogen such as, for example, palladium metal, palladium oxide, iron hydroxide, gold hydroxide, and the catalyst may subsequently be freed by washing from nitrogen, sulphur and halogen compounds. For example, organic palladium and optionally iron compounds can be applied to the support in solution in an organic solvent, and the support may be dried and then impregnated with alkali metal acetates from aqueous solution. The organic palladium and iron compounds may be completely or partly decomposed or converted under the drying conditions. The catalyst thus obtained can be treated with liquid or gaseous reducing agents such as aqueous hydrazine, hydrogen or ethylene, as a result of which the palladium compounds are reduced to palladium metal.

The process according to the invention can be carried out at normal pressure or at elevated pressure, preferably at pressures of from about 1 to 10 atmospheres. The completed catalyst advantageously contains about 1 to 10 g of palladium, expressed as metal, and from about 1 to 50 g of alkali metal acetate per liter of catalyst. In cases where iron compounds are used as additives the completed catalyst may also contain with advantage from, for example, about 0.1 to 10 g of iron, expressed as metal. The same applies as regards the addition of other metals. The starting materials required for preparing the 3-acetoxy-2-methylene propionic acid alkyl esters should preferably be free from halogen, sulphur and nitrogen compounds.

In addition to methacrylic acid alkyl ester, oxygen and acetic acid, the gas entering the reactor may also contain water vapor and inert constituents such as for example nitrogen, argon or carbon dioxide. The concentration of oxygen at the inlet end of the reactor is advantageously chosen so as not to exceed the explosive limit of the gas mixture in the reactor.

The acetic acid introduced into the reactor can be used in excess in relation to the stoichiometrically necessary quantity. The quantities of acetic acid, methacrylic acid alkyl ester and optionally water are chosen in such a way that the reactants are in the gas phase under the reaction conditions.

If the alkali metal is introduced as a compound other than the acetate, it is largely converted into alkali metal acetate under the reaction conditions.

The alkali metal acetate has a certain though very limited vapor pressure under the reaction conditions. The result of this is that small quantities of alkali metal acetate are continuously removed from the catalyst. In order to maintain the activity of the catalyst, it has proved to be of advantage to compensate for this loss of alkali metal acetate by the introduction of alkali metal acetate either continuously or at intervals. Alkali metal acetate may be added for example by continuously introducing a small quantity of a solution of alkali metal acetate in acetic acid or water into the superheater preceding the reactor. The alkali metal acetate volatilizes together with the solvent in the hot gas stream and is thus uniformly delivered to the catalyst. The quantity of alkali metal acetate is advantageously chosen in such a way that it compensates for the loss attributable to removal from the catalyst and ensures that the catalyst always retains sufficient activity and selectivity.

The reaction is advantageously carried out in tubular reactors. Suitable dimensions of the reaction tubes are, for example, lengths of from about 4 to 8 meters and internal diameters of, for example, from about 20 to 50 mm. The heat of reaction can be dissipated with advantage by boiling cooling liquids which circulate around the outside of the reaction tubes, for example, water under pressure.

The reaction may be carried out for example by passing a recycle gas consisting essentially of nitrogen, carbon dioxide and oxygen under pressure through an evaporator containing acetic acid, methacrylic acid alkyl ester and water, and charging the recycle gas with the requisite quantity of acetic acid, methacrylic acid alkyl ester and water by suitably selecting the composition of the liquid product in the evaporator. The mixture is then heated under pressure to the reaction temperature and the oxygen required for the reaction is added. On completion of the reaction, the gas mixture can be cooled under the reaction pressure and separated in a separator into a liquid phase consisting essentially of unreacted acetic acid, unreacted methacrylic acid alkyl ester, water and any 3-acetoxy-2-methylene propionic acid alkyl ester formed, and into a gas phase which consists essentially of nitrogen, carbon dioxide and oxygen and which can be returned as recycle gas. Since small quantities of carbon dioxide are formed as secondary by-product during the principal reaction to form 3-acetoxy-2-methylene propionic acid alkyl ester, it is of advantage to remove the carbon dioxide formed during the reaction from the circuit after a certain concentration has been reached in cases where the process is practiced on an industrial scale. A gas consisting essentially of carbon dioxide and unreacted oxygen may be used as the recycle gas.

The 3-acetoxy-2-methylene propionic acid alkyl ester formed can be recovered in pure form from the liquid reaction product by distillation. In cases where the process is practiced on an industrial scale, the water formed during the reaction can be isolated during working up of the liquid reaction products by distillation and removed from the circuit as effluent. Unreacted methacrylic acid alkyl ester and the unreacted acetic acid can be returned to the reaction.

A variety of alkyl esters of methacrylic acid may be used as the methacrylic acid alkyl esters, the following being mentioned by way of example: methacrylic acid methyl ester, ethyl ester, isopropyl ester, butyl ester or higher esters containing for example eight carbon atoms. The reaction is preferably carried out with methacrylic acid methyl ester because it is easy to manufacture on a large scale. In this case, 3-acetoxy-2-methylene propionic acid methyl ester is obtained. Alkyl esters of 3-acetoxy-2-methyl propionic acid are suitable for use in the production of modified polyesters.

The invention is further illustrated in the following example:

EXAMPLE 900 ml of a catalyst containing 3.3 g of palladium metal and 30 g of potassium acetate per liter of a silica support in the form of 5 mm diameter beads (prepared by impregnating the support with a solution of sodium palladium chloride, converting the chloride into the hydroxide by treatment with sodium hydroxide solution and reducing the palladium hydroxide to palladium metal by means of aqueous hydrazine solution), were introduced into a reaction tube with an internal diameter of 25 mm and a length of 2 meters. Boiling water under pressure and at a temperature of 140°C flowed around the outside of the reaction tube. The following products were passed over the catalyst in the gas phase under a pressure of 1 atmosphere and at a temperature of 140°C:

3 gram mols/hour of acetic acid
2 gram mols/hour of methyl methacrylate
2 gram mols/hour of oxygen 20 gram mols/hour of nitrogen The gaseous reaction product was cooled to 20°C and separated in a separator into a gas phase and a liquid phase. Analysis of the liquid phase by gas chromatography showed that a new component had been formed. This was isolated by distillation in the form of a product boiling at 112°C/28 mm Hg. Analysis by nuclear magnetic resonance spectroscopy showed that the compound was extremely pure 3-acetoxy-2-methylene propionic acid methyl ester. 3-acetoxy-2-methylene propionic acid methyl ester was obtained at a rate of 20 g per hour per liter of catalyst. Of the methacrylic acid methyl ester reacted, 90 percent was converted into 3-acetoxy-2-methylene propionic acid methyl ester and 10 percent into carbon dioxide. Addition of 1.5 g of auric chloride to the palladium solution used to impregnate the silica support gives a catalyst which, under the same conditions increases the rate to 24 g per hour per liter of catalyst.

As noted hereinabove, the reaction temperature may range from about 50 to 250°C. Since it is effected in the vapor phase, it is clear that the lower temperature corresponds to relatively low partial pressures of the reactants, in which case operation under vacuum would be advisable to provide appreciable concentration of reactants. Preferably, however, the reaction is effected at atmospheric or elevated pressures and the reaction temperature preferably ranges from about 100 to 250°C.

The methyl ester of 3-acetoxy-2-methylene propionic acid may be added to a mixture of dimethyl terephthalate and ethylene glycol such as is normally employed to make polyethylene terephthalate fibers. Methanol is evolved and the 3-acetoxy-2-methylene propionic acid enters the product at the ends of each molecule, i.e., it functions as a chain stopper limiting the molecular weight of the product. The product is made into fiber in usual manner and the pendant methylene groups form sites which may cross-link or be reacted with suitable dyes.

It will be appreciated that the instant specification and examples are set forth by way of illustration and not limitation, and that various modifications and changes may be made without departing from the spirit and scope of the present invention.

What is claimed is:

1. A process for the production of 3-acetoxy-2-methylene propionic acid alkyl esters, wherein methacrylic acid alkyl ester, oxygen and acetic acid are reacted in the gas phase at a temperature of from about 50 to 250°C in the presence of a palladium catalyst containing an alkali metal acetate.

2. The process according to claim 1, wherein the catalyst contains from about 1 to 10 g of palladium, expressed as metal, and from about 1 to 50 g of alkali metal acetate per liter of catalyst.

3. The process according to claim 1, wherein the catalyst contains additions of one or more metals or compounds of metals selected from the group consisting of gold, copper and metals of the fifth to eighth Groups of the Periodic System.

4. The process according to claim 1, wherein the gas after leaving said catalyst is condensed and the non-condensible gas is recycled, after adjustment of its composition, for further reaction.

5. The process according to claim 1, wherein small quantities of alkali metal acetate are added to the catalyst either continuously or at intervals during the process to compensate for acetate losses due to volatilization.

6. The process according to claim 1, wherein methacrylic acid methyl ester is used as the methacrylic acid alkyl ester for the reaction.

7. The process according to claim 6, wherein the catalyst contains from about 1 to 10 g of palladium, expressed as metal, and from about 1 to 50 g of alkali metal acetate per liter of catalyst, the catalyst contains additions of one or more metals or compounds of metals selected from the group consisting of gold, copper and metals of the fifth to eighth Groups of the Periodic System, small quantities of alkali metal acetate are added to the catalyst either continuously or at intervals during the process to compensate for acetate losses due to volatilization, and the gas after leaving said catalyst is condensed and the non-condensible gas is recycled, after adjustment of its composition, for further reaction.

* * * * *